US009052190B2

(12) United States Patent
Salehpour et al.

(10) Patent No.: US 9,052,190 B2
(45) Date of Patent: Jun. 9, 2015

(54) BRIGHT-FIELD DIFFERENTIAL INTERFERENCE CONTRAST SYSTEM WITH SCANNING BEAMS OF ROUND AND ELLIPTICAL CROSS-SECTIONS

(71) Applicant: KLA-Tencor Corporation, Milpitas, CA (US)

(72) Inventors: Ali Salehpour, Saratoga, CA (US);
Jaydeep Sinha, Livermore, CA (US);
Kurt Lindsay Haller, Pleasanton, CA (US); Pradeep Vukkadala, Fremont, CA (US); George Kren, Los Altos Hills, CA (US); Jiayao Zhang, Sunnyvale, CA (US); Mehdi Vaez-Iravani, Los Gatos, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 247 days.

(21) Appl. No.: 13/797,901

(22) Filed: Mar. 12, 2013

(65) Prior Publication Data

US 2014/0268172 A1    Sep. 18, 2014

(51) Int. Cl.
*G01B 11/02* (2006.01)
*G01B 11/30* (2006.01)

(52) U.S. Cl.
CPC ............ *G01B 11/303* (2013.01); *G01B 11/306* (2013.01); *G01B 2210/56* (2013.01)

(58) Field of Classification Search
CPC ........... G01B 9/02034; G01B 9/02098; G01B 11/162; G01B 11/2408; G01B 11/2441; G01B 11/303; G01B 11/306; G01B 2210/56
See application file for complete search history.

(56) References Cited

U.S. PATENT DOCUMENTS

2004/0115843 A1    6/2004 Wack et al.

FOREIGN PATENT DOCUMENTS

| JP | 2000035540 A | 2/2000 |
| JP | 2002287328 A | 10/2002 |
| JP | 2007086610 A | 4/2007 |
| JP | 2011220757 A | 11/2011 |

*Primary Examiner* — Hwa Lee
(74) *Attorney, Agent, or Firm* — Bever, Hoffman & Harms, LLP

(57) ABSTRACT

A method of providing high accuracy inspection or metrology in a bright-field differential interference contrast (BF-DIC) system is described. This method can include creating first and second beams from a first light beam. The first and second beams have round cross-sections, and form first partially overlapping scanning spots radially displaced on a substrate. Third and fourth beams are created from the first light beam or a second light beam. The third and fourth beams have elliptical cross-sections, and form second partially overlapping scanning spots tangentially displaced on the substrate. At least one portion of the substrate can be scanned using the first and second partially overlapping scanning spots as the substrate is rotated. Radial and tangential slopes can be determined using measurements obtained from the scanning using the first and second partially overlapping scanning spots. These slopes can be used to determine wafer shape or any localized topography feature.

26 Claims, 14 Drawing Sheets

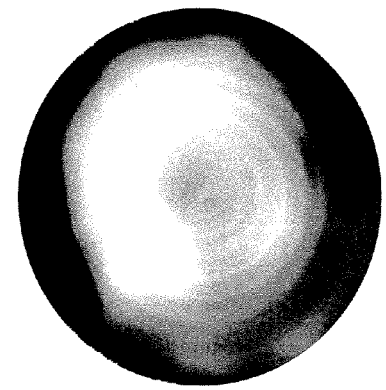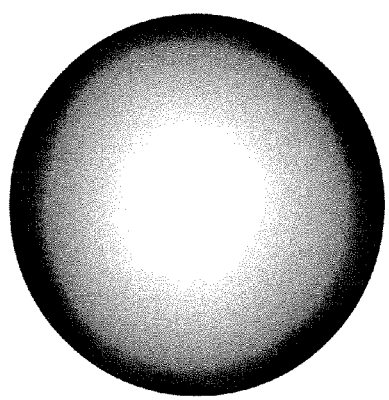
Figure 7C
Figure 7D
Figure 7B

BRIGHT-FIELD DIFFERENTIAL INTERFERENCE CONTRAST SYSTEM WITH SCANNING BEAMS OF ROUND AND ELLIPTICAL CROSS-SECTIONS

BACKGROUND OF THE INVENTION

Semiconductor wafers use increasingly expensive materials, fabrication equipment, and computing resources as successive technology nodes are brought into production. Therefore, wafer processes are carefully honed to ensure that these materials, equipment, and resources are not wasted. For example, irregularities in the surface of a wafer may result in less than optimal functioning of the electronic devices formed by the wafer or even non-functional electronic devices. As a result, the manufacture of modern nanometer-scale electronic devices requires the accurate measurement and control of substrate flatness and geometry. Indeed, tolerance to nanometer-scale deviations from perfect planarity and thickness uniformity is constantly tightening as the semiconductor industry shrinks minimum photolithography feature sizes and corresponding depth-of-focus (DOF) budgets.

Another issue of continuing concern in the semiconductor industry is the edge profile of the wafer, particularly a wafer constructed from a brittle substrate material such as crystalline silicon, quartz, or sapphire. The sharp corner at the edge of a wafer is typically macroscopically rounded to avoid edge chipping in the course of normal handling. In turn, this chipping may result in stress risers, thereby increasing the probability of substrate breakage, especially during high temperature processing.

To fabricate the maximum possible number of devices on a substrate, the edge profile would ideally have no effect on planarity up to a few tenths of a millimeter from the apex of the edge. However, in practice, substrate front-surface grinding and polishing operations are performed after macroscopic rounding is imparted to the edge of the substrate. As a result, some amount of edge roll-off is inevitably imparted to the substrate, generally beginning several millimeters from the edge.

Edge roll-off (ERO) is generally quantified by such metrics as ESFQR and ZDD, which are known in the industry. When using ESFQR (Edge flatness metric, Sector based, Front surface referenced, least sQuares fit reference plane, Range of the data within the sector), the flatness is measured within a sector of the wafer, i.e. a fan-shaped area formed on the outer periphery of the wafer. FIG. 1A illustrates a plurality of sectors 101 on a wafer 100. In one embodiment, 72 sectors at 5 degree intervals can be provided on the periphery of wafer 100. FIG. 1B illustrates a cross-sectional view of wafer 100 and an exemplary distance (in this case, 1 mm from the apex of the edge) for calculating ESFQR.

FIG. 1C illustrates an exemplary sector 101 in which a plurality of measurements 102 have been taken. In one embodiment, these measurements 102 include thickness information provided by a sensor and its associated electronics. The data from measurements 102 can be averaged so as to provide a thickness along a radius vector 103 of sector 101. Note that although shown as measurements taken at the edge of the wafer (see, sectors 101 of wafer 100 in FIG. 1A), measurements 102 can also be taken for the whole wafer or other parts thereof.

Typical processing of information from the sensor would yield a profile curve indicating a thickness profile (thickness vs. radius). Typically, such a profile would have a plurality of small surface unevenness with larger anomalies classified as bumps or voids (i.e. inverted bumps). Generally, the profile of thickness has a gradual roll-off or reduction in thickness as the edge of the wafer is reached.

When an anomaly such as a bump is present, the change in the slope (i.e. the $2^{nd}$ derivative) of the curve will go from negative to positive, thereby indicating a bump start radius (BSR). Second derivative processing converts the curve to a ZDD profile. An exemplary ZDD profile 105 (also called a ZDD metric) is shown in FIG. 1D. SEMI (Semiconductor Equipment and Materials International) Standard M68-1109, "Practice for Determining Wafer Near-Edge Geometry from a Measured Height Data Array Using a Curvature Metric, ZDD" is used by those in the semiconductor industry and describes ZDD profiles in greater detail. Because of the $2^{nd}$ derivative properties, the beginning of the BSR (or void) is easily identifiable as the zero crossing (point 106) in ZDD profile 105.

FIG. 2 illustrates a simplified inspection system 200 in which a wafer 201 is spun about its center on its axis 202. A wafer measurement tool 203 includes a sensor 203A configured to measure the distance to wafer 201. The output 204 of 203A can be processed by a data interpreter 205 and a post-processing tool 206 (e.g. a microprocessor) to develop the ESFQR and/or ZDD profile. Output information regarding one or more metrics, profiles, or other parameters can be provided to a user interface 207 via standard I/O devices. The tolerance limits for ESFQR and ZDD are generally specified by IC device makers.

Developing and subsequently maintaining acceptable ERO tolerances in production is of vital importance to substrate manufacturers. Indeed, some processes, such as chemical-mechanical polishing (CMP), may alter the ERO of a substrate. In addition to the implications for lithographic depth-of-focus, the uniformity of downstream CMP processes could be affected if inadequate measures are taken to monitor ERO variation. Therefore, a need arises for improved inspection techniques and systems for determining ERO as well as surface topography.

SUMMARY

A method of providing high accuracy inspection or metrology in a bright-field differential interference contrast (BF-DIC) system is described. This method can include creating first and second beams from a first light beam. The first and second beams have round cross-sections, and form first partially overlapping scanning spots radially displaced on a substrate. Third and fourth beams are created from the first light beam or a second light beam. The third beam and the fourth beam have elliptical cross-sections, and form second partially overlapping scanning spots tangentially displaced on the substrate. At least one portion of the substrate can be scanned using the first and second partially overlapping scanning spots as the substrate is rotated.

A radial slope can be determined using measurements obtained from scanning the at least one portion of the substrate using the first partially overlapping scanning spots as the substrate is rotated. A tangential slope can be determined using measurements obtained from scanning the at least one portion of the substrate using the second partially overlapping scanning spots as the substrate is rotated. In one embodiment, the radial slope and the tangential slope can be used to determine a substrate curvature, which in turn can determine an edge roll-off of the substrate. In another embodiment, the radial slope and the tangential slope can be used to determine integrated height information of the substrate, which in turn can determine a wafer shape (e.g. convex bowl, concave bowl, etc.) or any localized topography feature (e.g. slope, bumps, etc.). In one embodiment, the method can further include compensating for chucking distortions when determining the substrate shape. Substrate topography can be determined by applying filtering to either the integrated height or the substrate shape.

In one embodiment, the enhanced BF-DIC technique can be used to determine a wafer shape before and after the deposition of a layer on the wafer. A shape difference can be computed based on the wafer shape before and after deposition. A film-stress map can be generated based on the shape difference.

The results of the scanning can be used to characterize, monitor, and/or modify a wafer process. An exemplary wafer process includes integrated circuit chemical-mechanical polishing (CMP). In accordance with enhanced BF-DIC technique, the wafer can be patterned or unpatterned.

Another method of providing high accuracy inspection or metrology in a BF-DIC system is also described. In this method, first and second beams are created from a first light beam. The first and second beams have round cross-sections, and form first partially overlapping scanning spots displaced in a first direction. Third and fourth beams are created from either the first light beam or a second light beam. The third and fourth beams have elliptical cross-sections, and form second partially overlapping scanning spots displaced in a second direction, wherein the first direction and the second direction are orthogonal. At least one portion of the substrate is scanned using the first and second partially overlapping scanning spots as the substrate is moved.

In this method, a first slope in the first direction can be determined using measurements obtained from the scanning using the first partially overlapping scanning spots as the substrate is moved. A second slope in the second direction can be determined using measurements obtained from the scanning using the second partially overlapping scanning spots as the substrate is moved. Substrate curvature, edge roll-off, integrated height information, and substrate shape can be determined using the first and second slopes. The method can further include compensating for chucking distortions when determining the substrate shape. Substrate topography can be determined by applying filtering to either the integrated height or the substrate shape.

A bright-field differential interference contrast (BF-DIC) system configured to provide high accuracy inspection or metrology is also discussed. The BF-DIC system includes at least one sub-system, wherein each sub-system includes a prism, focusing optics, photo-detectors, and a data acquisition circuit. The prism is configured to receive a light beam and generate two beams from the light beam. The focusing optics are configured to direct and focus the two beams onto a substrate as two partially overlapping scanning spots. The photo-detectors are configured to receive light reflected from the substrate from the two partially overlapping scanning spots. The data acquisition circuit is configured to process outputs of the photo-detectors. The system can further include an apparatus for securing and moving the substrate, and a computer operatively coupled to the data acquisition circuit and the apparatus for securing and moving the substrate.

Notably, in a first orientation of the prism, the two beams are radially disposed with respect to the substrate and the focusing optics provide the two beams with round cross-sections. In a second orientation of the prism, the two beams are tangentially disposed with respect to the substrate and the focusing optics provide the two beams with elliptical cross-sections. In one embodiment, the at least one sub-system includes first and second sub-systems, wherein the prism of the first sub-system has the first orientation, and the prism of the second sub-system has the second orientation. In one embodiment, the at least one sub-system includes first and second sub-systems, wherein the first and second sub-systems provide concurrent scanning for first and second portions, respectively, of the substrate.

Notably, this enhanced BF-DIC technique can be embodied as an integral sub-system in other types of wafer inspection and metrology equipment well known to those conversant with practices in the semiconductor industry. The technique may also be embodied as an integral sub-system in wafer processing equipment including, for example, photolithography scanners. Productivity (i.e. the number of wafers that an equipment system can inspect, measure, and/or process per unit time) being a critical factor in wafer production costs, each of these sub-system embodiments can be implemented such that enhanced BF-DIC data acquisition occurs substantially in parallel with standard inspection, metrology, or process functions.

BRIEF DESCRIPTION OF THE DRAWINGS

FIGS. 7B and 7C illustrate radial and tangential slope wafer BF-DIC images, respectively.

FIG. 7D illustrates an exemplary wafer shape image based on the radial and tangential slope wafer images of FIGS. 7B and 7C.

FIG. 7E illustrates an exemplary image showing reference topography measurements for a portion of a patterned wafer, whereas FIG. 7F illustrates a corresponding image showing BF-DIC topography measurements with filtering.

DETAILED DESCRIPTION OF THE DRAWINGS

In accordance with an improved inspection system, a differential interference contrast (DIC) technique can be enhanced to provide measurements of ERO as well as a variety of other substrate geometry, flatness, and topographic metrics with sub-nanometer surface height resolution. In the DIC technique, a linearly-polarized laser beam is split into two, proximate beams with mutually orthogonal planes of polarization.

In one embodiment, the laser beam can be split into the two beams using a Wollaston prism, which is built from two wedges of a birefringent material having optical axes parallel to the outer surface of the prism, but perpendicular to each other. The two beams are focused by other optical elements such as lenses onto the surface of a substrate, wherein the term "substrate" refers to a workpiece of any material composition, including for example a silicon wafer.

Figure 1B:
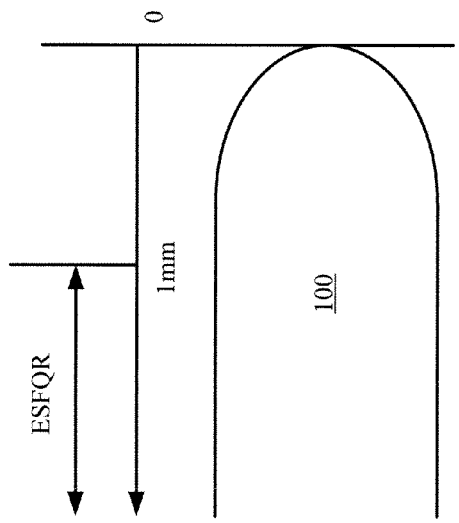
FIG. 1B illustrates a cross-sectional view of a wafer and an exemplary distance for calculating ESFQR.
Figure 1D:
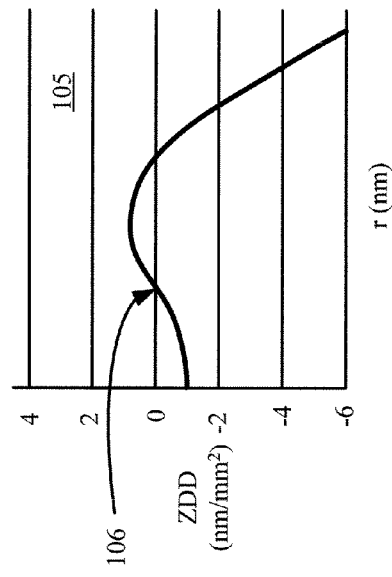
FIG. 1D illustrates an exemplary ZDD profile.
Figure 1A:
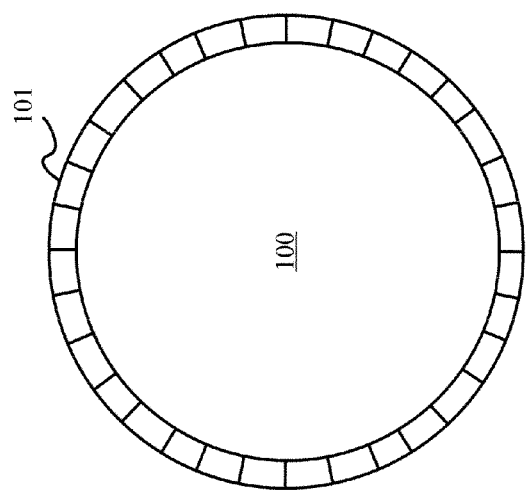
FIG. 1A illustrates a plurality of sectors on a wafer.
Figure 1C:
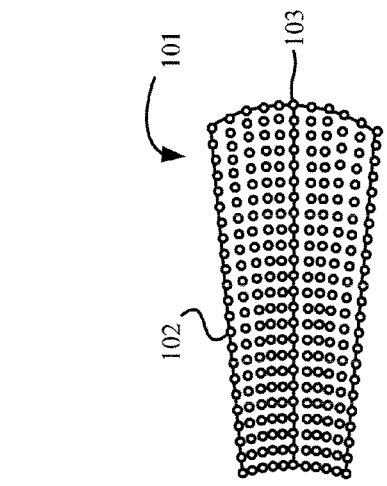
FIG. 1C illustrates an exemplary sector in which a plurality of measurements has been taken.
Figure 2:
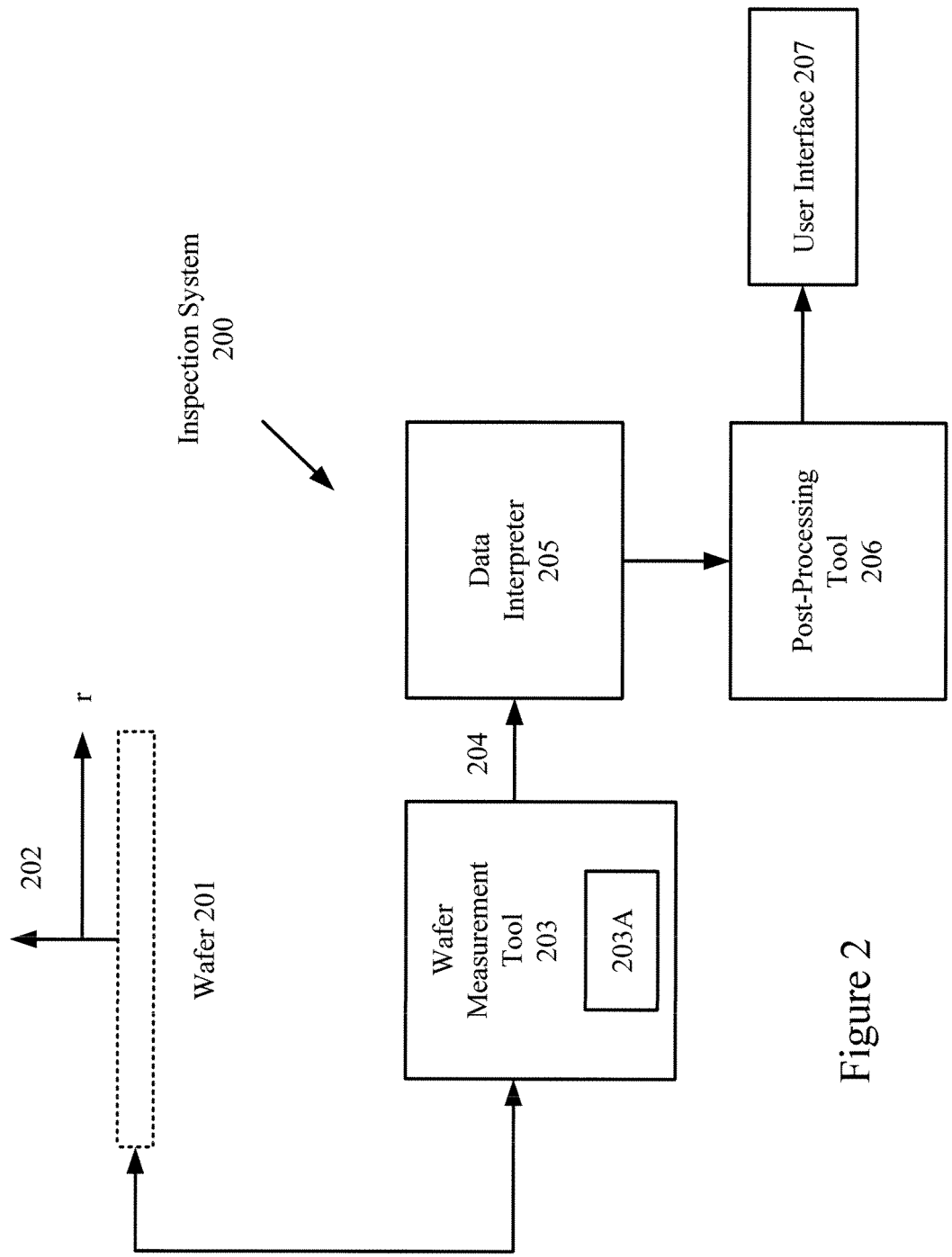
FIG. 2 schematically illustrates an inspection system in which a wafer is spun about its axis.
Figure 3A:
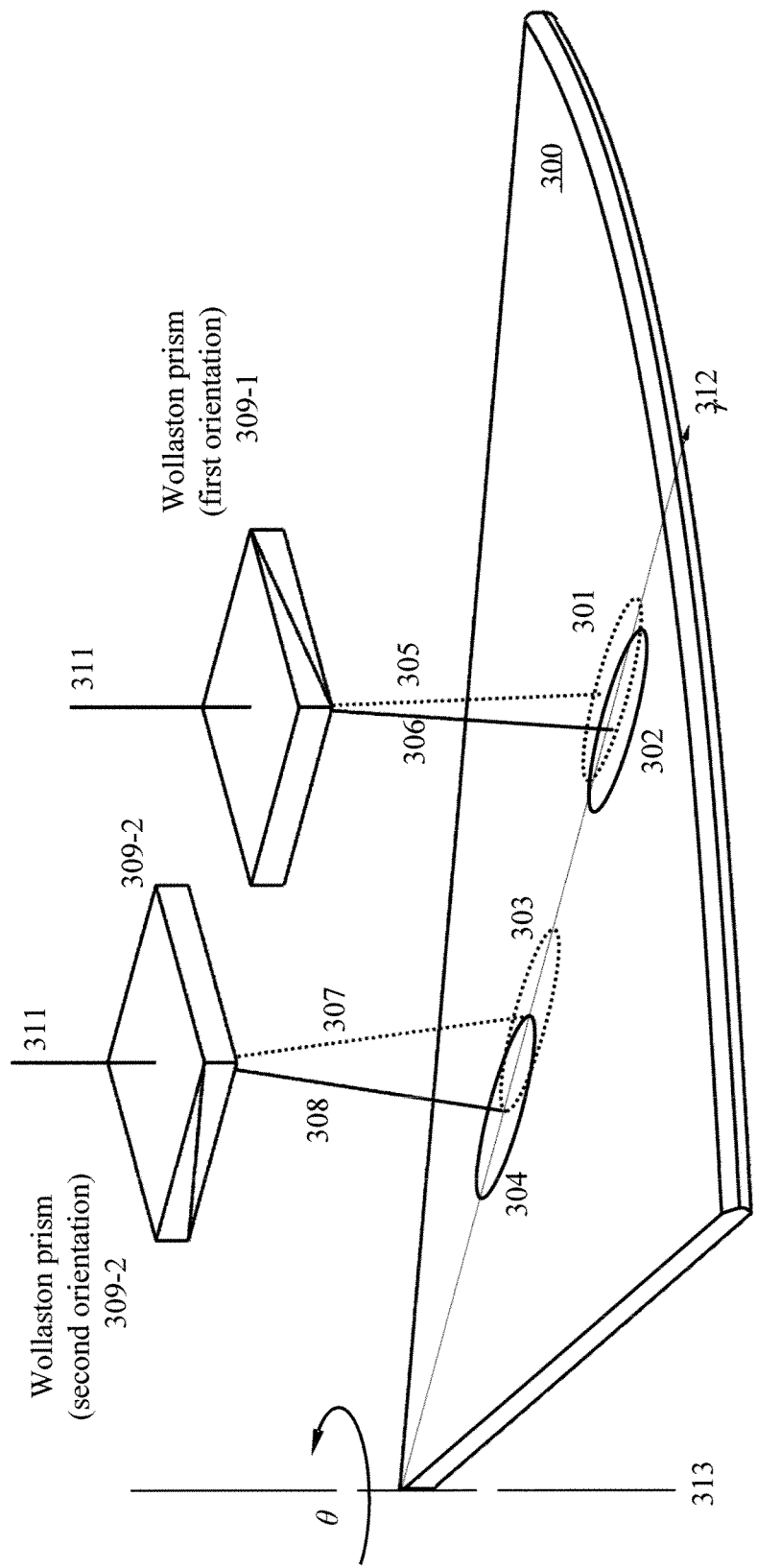
FIG. 3A illustrates a portion of an exemplary wafer and four elliptical beams, with one pair of beams displaced in the tangential direction with respect to a spiral scan path on the wafer surface, and the other pair displaced in the radial direction.

FIG. 3A illustrates a Wollaston prism 309 (in a first orientation, 309-1) that uses an input light beam 311 to generate two beams 305 and 306. In one embodiment, beams 305 and 306 are elliptical (i.e. in cross section). Beams 305 and 306 form two, partially overlapping scanning spots 301 and 302 on a wafer 300. In this orientation, scanning spots 301 and 302 have minor axes that are co-linear and parallel to the tangential direction, and major axes that are nearly parallel to the radial direction (i.e. because scanning spots 301 and 302 are positioned on either side of an actual radial direction 312, their major axes are not exactly parallel to the radial direction). In one embodiment, scanning spots 301 and 302 have centers that are displaced by approximately one half of the minor axes' length.

Thus, beams 305 and 306 have a beam displacement in the tangential direction with respect to a spiral scan path on the wafer surface. Note that the spiral scan path is provided by spinning wafer 300 (i.e. a rotation θ about a center of rotation 313) while linearly translating the center of rotation along a distance equal to or less than the radius r of wafer 300. As described above, the two scanning spots' major axes are nearly parallel to the radial direction, which shortens inspection time because the pitch between successive spiral scan tracks may be set to approximately one-half of the scanning spots' major axis length. At any point along the scan path, scanning spots 301 and 302 reflect from the surface of wafer 300, recombine upon going back through the Wollaston prism 309 in the reverse direction, and create a generally elliptically-polarized beam when the optical path length for one beam is different from that of the other.

For substrate materials that are substantially opaque at the DIC system's laser wavelength, optical path length differences resulting from the illuminated portion of the surface have non-zero slope along the beam displacement direction. When transparent films are present or the substrate is itself semi- or fully transparent, path length differences may arise from localized asperities in film thicknesses or refractive indices. These asperities may come from crystallographic defects in a substrate, and/or foreign particles on or embedded in the films or substrate. An optical path difference amounts to a phase shift between the reflected beams, whose interference in the DIC system converts such phase shifts into light intensity fluctuations in a manner known to those skilled in the art. These different light levels are converted by photo-detectors to electronic signals and processed into a normalized DIC signal S, thereby facilitating the generation of a three-dimensional data set (r, θ, S) spanning the wafer surface.

Figure 4:
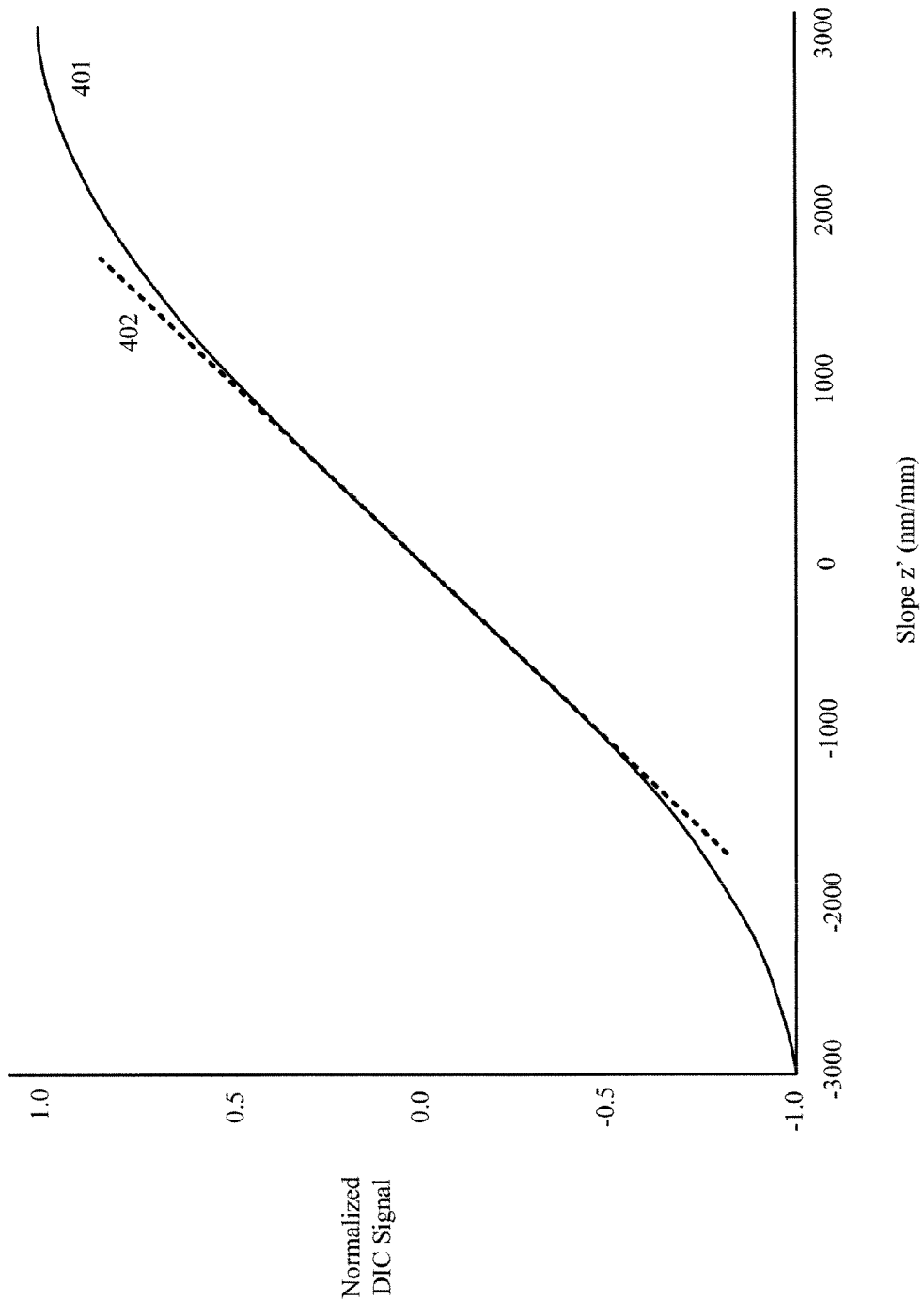
FIG. 4 illustrates an exemplary normalized signal S that varies with the surface slope z'.

The signal S varies with the component of the surface slope along the direction defined by the two displaced scanning spots' centers. The functional dependence of S on the surface slope z' is shown in FIG. 4. Specifically, $$S \approx \sin\left(\frac{4\pi\delta}{\lambda}z'\right),$$

where λ is the laser wavelength and δ is the distance between the scanning spots' centers. With λ=633 nm and δ=25 μm, the response (as shown by exemplary curve 401 in FIG. 4) is very nearly linear (see dotted line 402) in z' over a range of ±1000 nm/mm and cubic over ±2000 nm/mm according to the equation $$S \approx \sin\left(\frac{4\pi\delta}{\lambda}z'\right) \approx \frac{4\pi\delta}{\lambda}z'\left[1 - \frac{1}{6}\left(\frac{4\pi\delta}{\lambda}z'\right)^2\right].$$

BF-DIC techniques can detect relatively localized defects in the substrate surface (such as bumps, dimples, pits, and scratches), as a result of relatively abrupt changes in surface slopes in the neighborhood of such defects.

Notably, a DIC system with tangential beam displacement, which can generate scanning spots 301 and 302 (FIG. 3A), is substantially insensitive to the radial component of surface slope. The radial component is the dominant component of slope in the ERO region. Therefore, to create radial slope sensitivity, the beam displacement direction can be rotated by 90°. In one embodiment, this rotation can be done by rotating Wollaston prism 309 by 90° (i.e. providing a second orientation 309-2), thereby producing radially displaced beams 307 and 308. Beams 307 and 308 form two, partially overlapping scanning spots 303 and 304 on wafer 300. In this orientation, scanning spots 303 and 304 have minor axes that are co-linear and parallel to the radial direction, and major axes that are parallel to the tangential direction.

Note that for any given Wollaston prism the separation between the two beams is proportional to the respective beam size along the displacement direction. For example, if a Wollaston prism produces 50% overlap tangentially, then rotating that Wollaston prism by 90° produces 50% overlap radially. The amount of beam displacement can be altered by choosing a Wollaston prism with a different wedge angle. In one embodiment, a preferred beam displacement is about 50%, because greater displacement imparts stronger noise and smaller displacement entails weaker signal. (In fact, two perfectly overlapped beams produce zero signal everywhere).

For the measurement of ERO, even finer resolution in the radial direction is advantageous. Moreover, ERO need only be measured in a narrow annular region near the substrate edge, so elongation of the beams in the radial direction may be dispensed with.

Figure 3B:
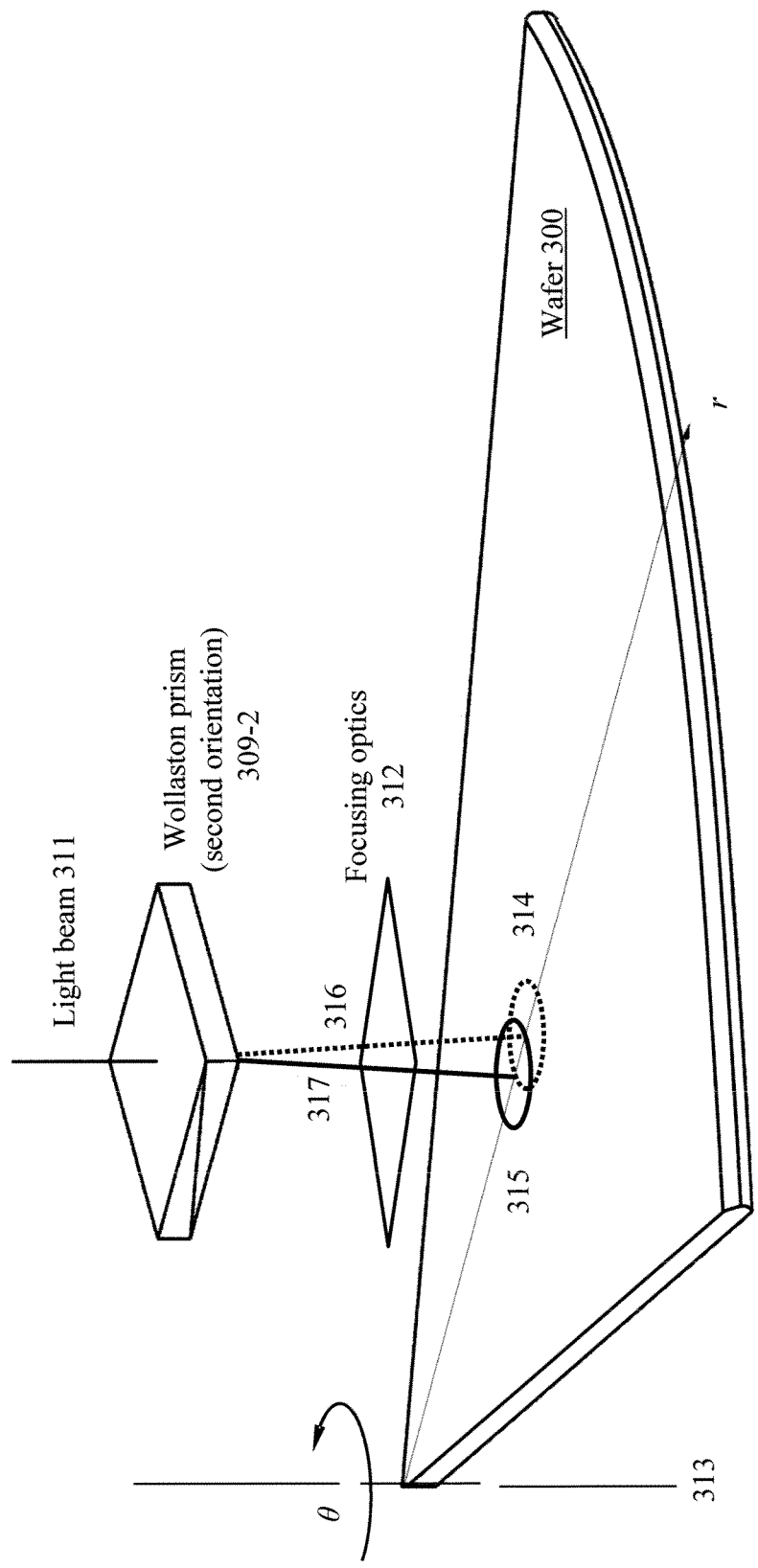
FIG. 3B illustrates a portion of an exemplary wafer and two round beams, where the beam displacement is in the radial direction with respect to a spiral scan path on the wafer surface.

Therefore, in accordance with one aspect of an enhanced BF-DIC inspection system and referring to FIG. 3B, focusing optics 312 of the inspection/metrology tool can be configured to generate small round (in cross-section) beams 316 and 317 rather than the elliptical beams 307 and 308 (FIG. 3A). To achieve even higher spatial resolution, beams 316 and 317 may be focused with diffraction-limited optics. Beams 316 and 317 form two, partially overlapping scanning spots 314 and 315 on wafer 300. In this orientation, scanning spots 303 and 304 have centers that are co-linear and parallel to the radial direction. Note that embodiments implementing this fine spatial resolution are generally applied to a limited area of the wafer to minimize scanning time.

Figure 5A:
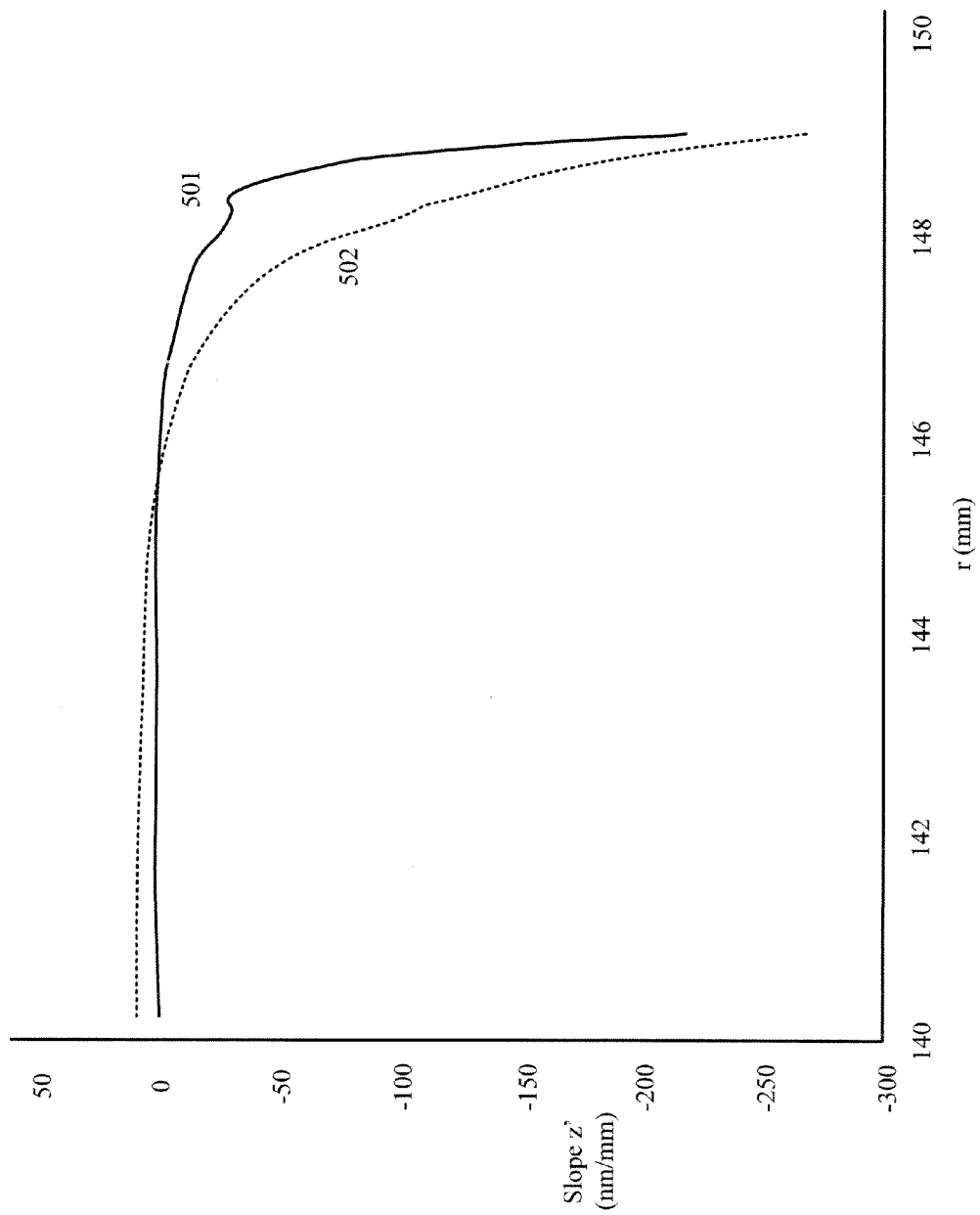
FIG. 5A illustrates two curves that indicate surface slope as a function of radius r for two types of silicon wafers.

Referring to the equations above, the range of slopes that the BF-DIC techniques can detect without phase wrapping (that is, the range of slopes possessing unique DIC signals) is a function of the laser wavelength and the beam displacement. FIG. 5A illustrates two curves 501 and 502 that indicate surface slope as a function of radius r for two types of silicon wafers. FIG. 5A indicates that for the specific wavelength and beam displacement of FIG. 4, the radial surface slopes in the ERO region fall within the linear response region for an important type of substrate, i.e. 300 mm silicon wafers. Note that in other embodiments, different substrates with different surface slope ranges may be measured with wavelengths and displacements tailored to a specific range of slopes.

Another aspect of the enhanced BF-DIC technique is the lateral adjustment of the Wollaston prism to null the signal when the surface slope is zero. Because localized substrate defects will cover both positive and negative values of slope, setting the zero-slope response to zero is thus most convenient for an inspection application. However, for the measurement of ERO, the radial surface slope range often covers a single polarity for the most part (see, e.g. FIG. 5A). Therefore, for substrates with extremely negative-going slopes, the Wollaston prism can be adjusted such that its linear response range is biased to accommodate negative polarity more than positive.

In general, the limit of measurable surface slope is reached when the reflected beam angle exceeds the maximum acceptance angle of an enhanced DIC system's focusing optics-as determined by its numerical aperture. Embodiments of the BF-DIC techniques described herein can have numerical aperture (NA) on the order of 0.0086, which corresponds to a maximum reflection angle of ~0.0086 rad, and a surface slope<4300 nm/mm. Surface slopes in the ERO region of the wafer are of the order of a few 100 nm/mm. Therefore, higher NA optics are unnecessary for the BF-DIC techniques described herein.

Figure 5B:
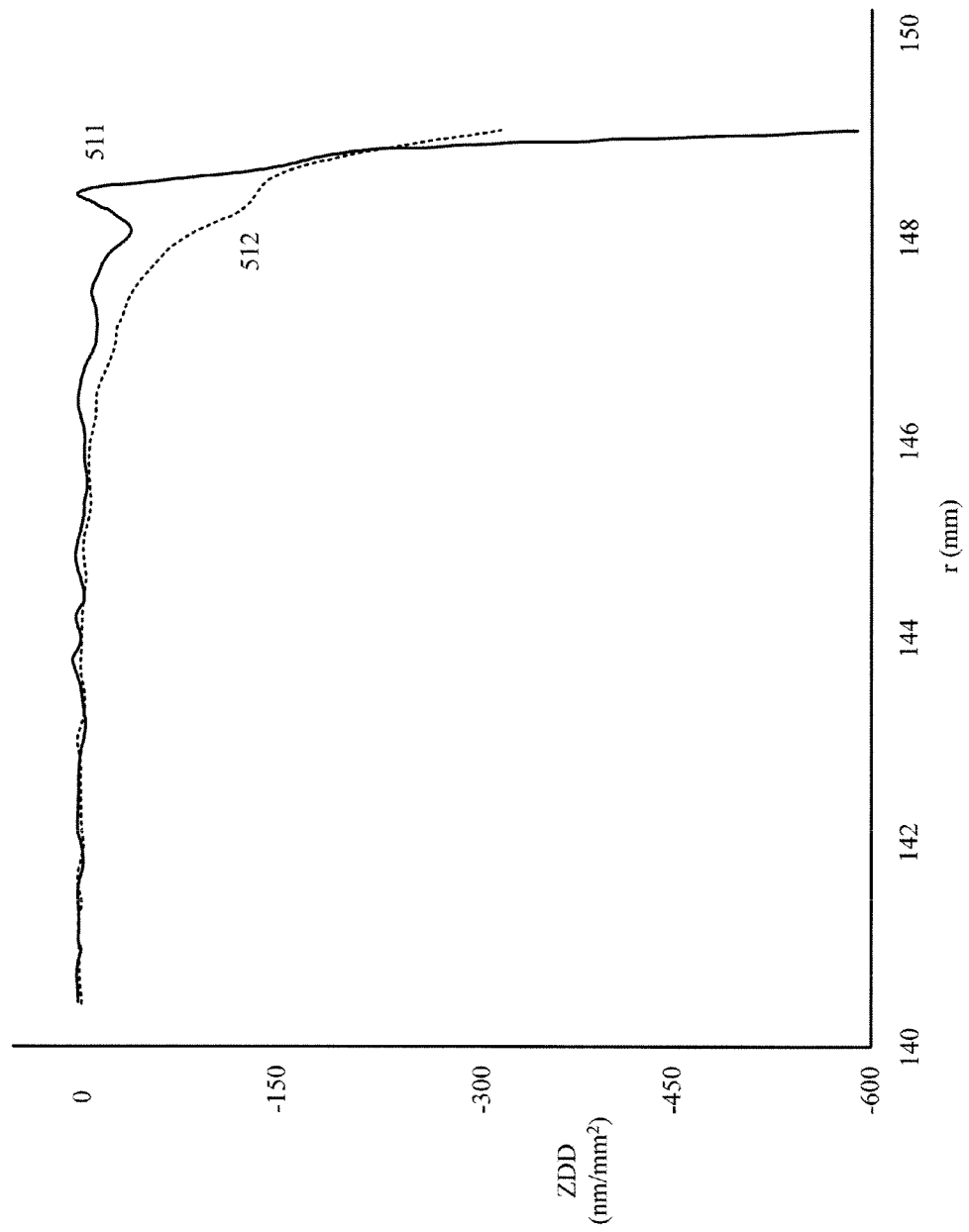
FIG. 5B illustrates curvature profiles (surface curvature ZDD as a function of radius r) derived from the surface slope profiles in FIG. 5A.

Note that the slope data may be processed with numerical methods to yield the surface height profile (via numerical integration) or the surface curvature (via numerical differentiation). Indeed, the surface curvature (average of radial curvature profiles, separated by 0.1°, spanning a sector of angle θ) at a specific radius is the SEMI Standard M68 ZDD metric. FIG. 5B illustrates typical curvature profiles 511 and 512 (surface curvature ZDD as a function of radius r) for the two exemplary silicon wafers referenced in FIG. 5A.

Figure 6:
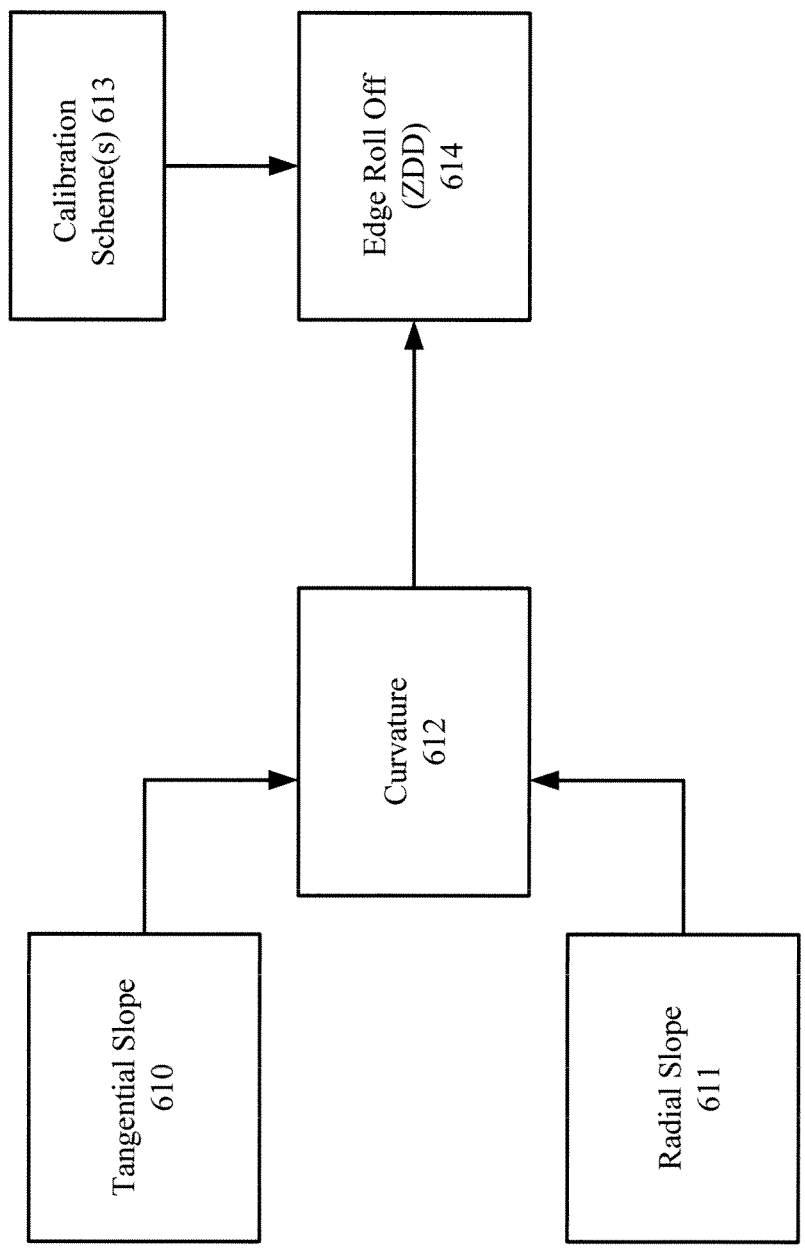
FIG. 6 illustrates an exemplary enhanced BF-DIC technique for generating an accurate ZDD value.

FIG. 6 illustrates an exemplary enhanced BF-DIC technique for generating an accurate ZDD value. Specifically, in this technique, tangential slope information 610 and radial slope information 611 can be used to determine curvature 612 along the gradient, i.e. the direction of maximum surface slope. Curvature 612 can be used to compute a generalized ZDD value 614 that does not necessarily correspond to a radial direction. Computing a ZDD value is described, for example, in SEMI M68-1109—Practice for Determining Wafer Near-Edge Geometry from a Measured Height Data Array Using a Curvature Metric, ZDD. In one embodiment, one or more calibration schemes 613 can be used to further increase the accuracy of the ZDD value 614, in particular the influence of chucking forces on the wafer, and dynamic forces during a scan. For example, accurate ZDD measurements obtained from the industry standard WaferSight™ tool, which is provided by KLA-Tencor Corporation, may be used to calibrate and improve the accuracy of ZDD measurements made using the enhanced BF-DIC technique.

As described above, partially-overlapping, round beams formed by the enhanced BF-DIC technique can be focused onto the wafer and scanned in a radial direction while the wafer is spinning to measure the radial ERO of the wafer with fine spatial resolution. Advantageously, this technique can be used for additional areas of the wafer as time permits. Indeed, these radial slope measurements in combination with the standard tangential slope measurements generated with partially-overlapping, elliptical beams can be used to construct an accurate surface height profile of the entire wafer.

One advantage of the operation of a system using BF-DIC is inherent insensitivity to vibrations. First, any vibration in the direction of wafer normal is common mode between the two beams and is therefore automatically eliminated. Second, the effect of any wobble with respect to the two spots will be severely attenuated. To show this, let the signals A and B of the two beams be given by:

$$A = 1 + \cos\{\delta\phi(t) + \beta\}$$

$$B = 1 - \cos\{\delta\phi(t) + \beta\}$$

where $\delta\phi$ is the instantaneous differential phase between the spots, and $\beta$ is a bias phase shift due to the lateral position of the Wollaston prism.

The effect of a wobble is to impose a time dependence on the position of the beams on the Wollaston prism. Thus, under the condition of quadrature operation, the effect of vibration can be written as:

$$\beta = \frac{\pi}{2} + \delta\beta(t)$$

Expanding the equations for A and B yields:

$$A = 1 - \sin[\delta\phi(t)]\cos[\delta\beta(t)] - \cos[\delta\phi(t)]\sin[\delta\beta(t)]$$

$$B = 1 + \sin[\delta\phi(t)]\cos[\delta\beta(t)] + \cos[\delta\phi(t)]\sin[\delta\beta(t)]$$

Therefore, subtracting one signal from the other yields:

$$\Delta = B - A = 2\delta\phi(t)\cos[\delta\beta(t)] + 2\sin[\delta\beta(t)]$$

assuming a small $\delta\phi(t)$, i.e. $\sin[\delta\phi(t)] = \delta\phi(t)$ and $\cos[\delta\phi(t)] \approx 1$.

As shown above, the effect of typical vibration amplitudes on the differential signal is negligible (limited to a cosine effect). Note that vibration can enter the inspection system directly as $2\sin[\delta\beta(t)]$. However, typical frequency ranges encountered for these vibrations is low compared to the desired differential signal. Thus, these frequency ranges result in spurious signals and can be filtered out electronically.

Note that when the scanning spots are displaced radially on the wafer, the inspection system is more susceptible to wobble compared to when the scanning spots are tangentially displaced. In particular, radial wafer wobble is typically more severe than tangential wobble given its axisymmetry, and radial wafer wobble has no impact on the lateral positions on the Wollaston prism for the tangential displaced beams. Additionally, the signal bandwidth in the radial direction is determined by the spin rate of the wafer, which is far lower than the video rate in the tangential direction. Therefore, preferred BF-DIC inspection system embodiments that measure both tangential and radial slope must use standard techniques to reduce the amplitude and frequency of wobble and other types of vibration.

Figure 7A:
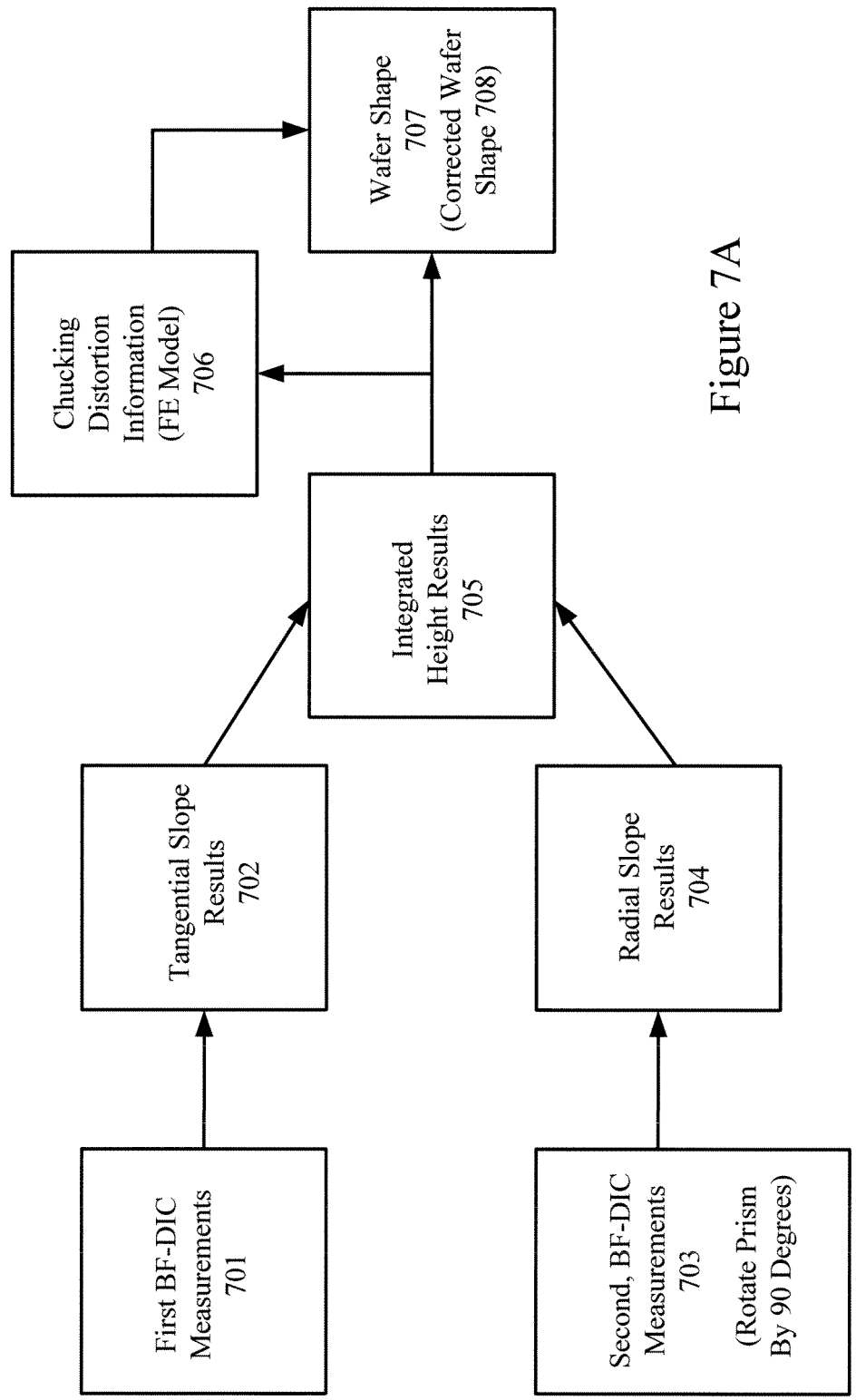
FIG. 7A illustrates an exemplary processing of information in which both tangential and radial slope information can be used to generate accurate height information of the wafer surface.

FIG. 7A illustrates an exemplary processing of information in which both tangential and radial slope information can be used to generate accurate height information of the wafer surface. First BF-DIC measurements 701 can be obtained from using the two tangentially-displaced elliptical beams that generate two partially-overlapping, tangentially-displaced scanning spots (e.g. scanning spots 301 and 302, FIG. 3A). Measurements from these partially-overlapping, tangentially-displaced scanning spots can generate tangential slope results 702. Second BF-DIC measurements 703 can be obtained from using the two radially-displaced round beams that generate two partially-overlapping, radially-displaced scanning spots (e.g. scanning spots 314 and 315, FIG. 3B). Measurements from these partially-overlapping, radially-displaced scanning spots can generate radial slope results 704.

As described above, the radially-displaced beams can be obtained by rotating the Wollaston prism by 90 degrees relative to the position of the prism when generating the tangentially-displaced beams. Tangential slope results 702 and radial slope results 704 can be used to generate integrated height results 705. For example, the tangential and radial slope information can be integrated to generate an accurate height for any location on the wafer. Such height information obtained of the wafer may include shape distortion induced by virtue of the force of gravity and other clamping forces acting on the wafer, while being held horizontally on a mounting or a clamping (chucking) system (such as a 3-point kinematic mount or an edge-handling chuck). These results 705 can subsequently be used to generate the wafer shape 707.

In one embodiment, the results 705 can be adjusted based on chucking distortion information 706 to obtain wafer shape information with improved accuracy 707. In this case, chucking distortion information 706 can be subtracted from wafer shape 707 to generate a corrected wafer shape 708. In one embodiment, chucking distortion information 706, provided as tangential and radial information of a known shape (e.g. bowl-shaped or flat) imparted to a wafer secured by a chuck, can be subtracted from enhanced BF-DIC wafer images. FIGS. 7B and 7C illustrate exemplary radial and tangential slope wafer images, respectively. In FIGS. 7B and 7C, dark (light) shading indicates negative (positive) slope. FIG. 7D illustrates an exemplary wafer shape image based on the radial and tangential slope wafer images of FIGS. 7B and 7C. In FIG. 7D, dark (light) shading indicates negative (positive) height. Note that such images are typically generated in various gradations of color, and therefore may show finer gradations of slope and height.

Optionally, chucking distortion information 706 (FIG. 7A) may be derived from a finite element (FE) model (which is known by those skilled in the art of semiconductor manufacturing) depending on chuck configuration. For example, when the chuck has grooves for applying a vacuum to secure the wafer onto the chuck, the chuck itself may directly contribute to surface distortions of the wafer, particularly in the areas spanning the grooves when the vacuum is applied. Other types of chucks may contribute different amounts of distortion to various areas of the wafer when secured by the chuck. Some state-of-the-art chucks may contribute only negligible distortion to the wafer and therefore chucking distortion information 706 can be ignored.

Figures 7E, 7F:
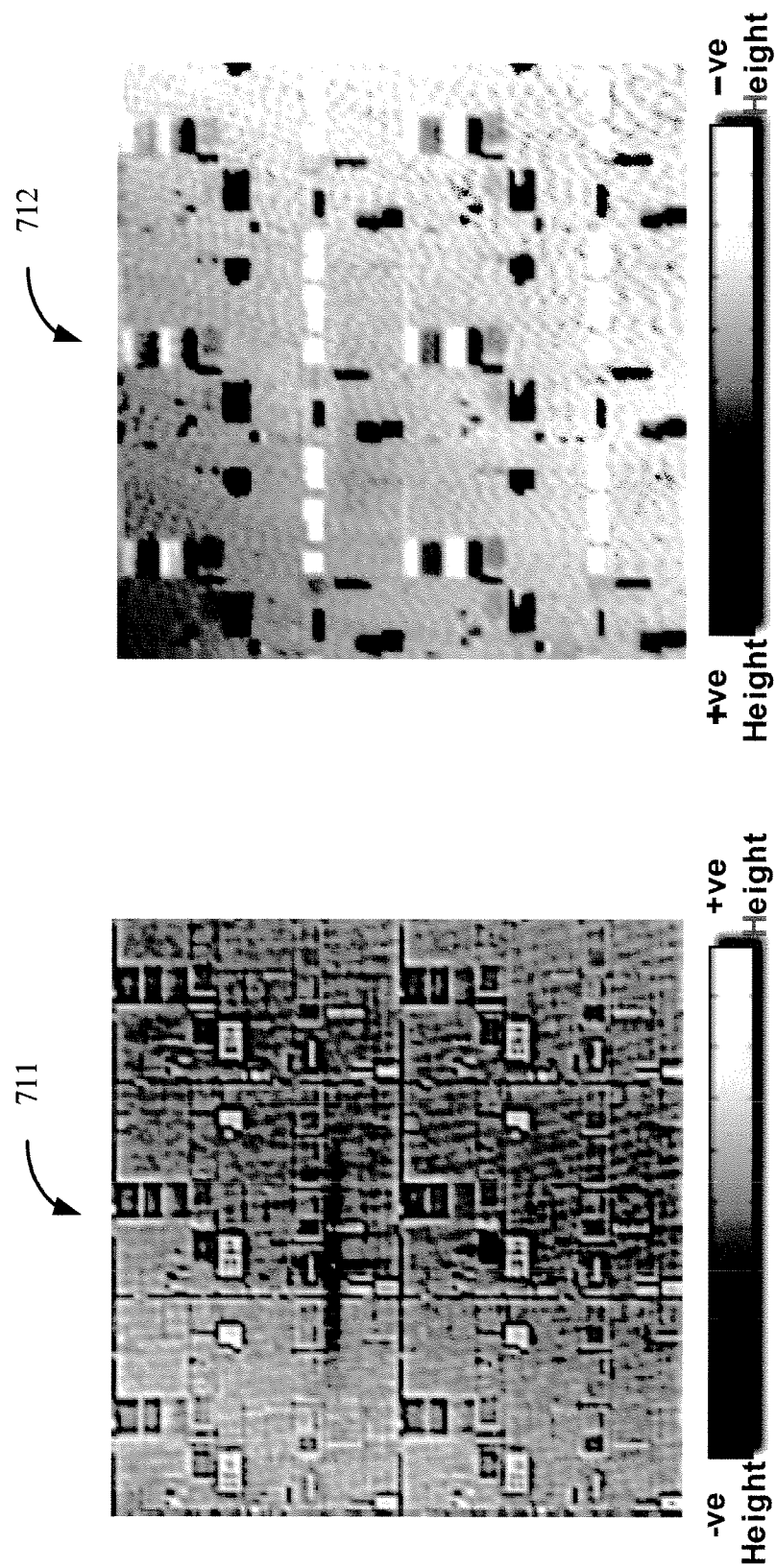

BF-DIC provides sufficiently high lateral resolution to derive the topography of the wafer substrate. Wafer topography may be obtained from either the integrated height data or the corrected wafer shape data by applying a high-pass filter to remove low-frequency features (high-pass filter may include filters such the Laplace filter etc.). FIG. 7E illustrates an exemplary image 711 showing reference topography measurements for a portion of a patterned wafer (e.g. obtained from the industry standard WaferSight™ tool), whereas FIG. 7F illustrates a corresponding image 712 showing BF-DIC topography measurements with filtering. In FIG. 7E, dark (light) shading indicates negative (positive) height, whereas in FIG. 7F, dark (light) shading indicates positive (negative) height. Images 711 and 712 advantageously show substantially the same topography measurements. Wafer topography is useful in getting insight into the higher-frequency height variation of the front-side of the wafer which may lead to defocus related issues on a lithography scanner during IC manufacturing on such a wafer substrate. Additionally, BF-DIC may be calibrated to measure the topography of a patterned wafer. For example, a predetermined set of wafers can be measured using both a reference metrology tool, such as the WaferSight™ tool, and a tool configured to provide the enhanced BF-DIC measurements. Comparing these measurements (like comparing FIGS. 7E and 7F) can provide calibration feedback for the tool configured to provide the enhanced BF-DIC measurements, thereby improving its accuracy.

In one embodiment, the shape information generated by the enhanced BF-DIC technique can be used to determine the residual stress of the wafer. For example, the deposition of a film layer on a substrate can induce stresses, which cause the substrate to curve (bow). Stresses that remain in a material without application of an external load are called residual stresses. During wafer fabrication, residual stresses can be induced by the deposition of a film on the substrate.

Figure 8A:
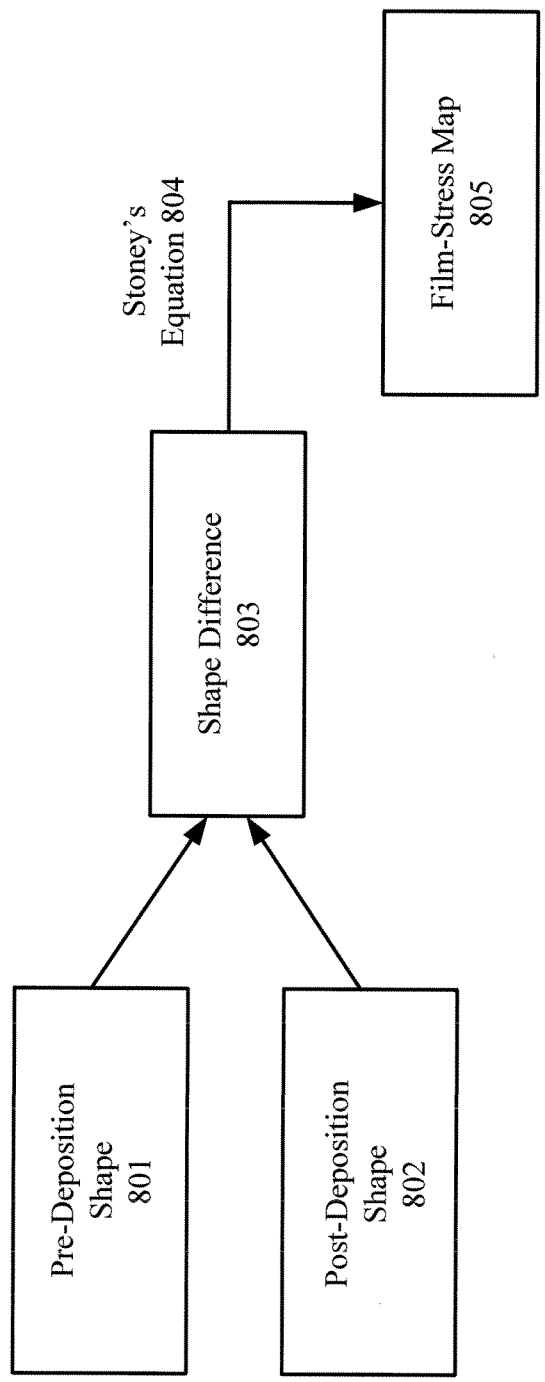
FIG. 8A illustrates an exemplary technique for generating a film-stress map for a wafer.

FIG. 8A illustrates an exemplary technique for generating a film-stress map for a wafer. In this technique, a pre-deposition shape 801 of a wafer and a post-deposition shape 802 of the wafer can be used to generate a shape difference 803. Notably, both pre-deposition shape 801 and post-deposition shape 802 can be generated using the enhanced BF-DIC technique described herein. After shape difference 803 is generated, Stoney's equation 804 can be used to generate an accurate film-stress map 805.

Figure 8B:
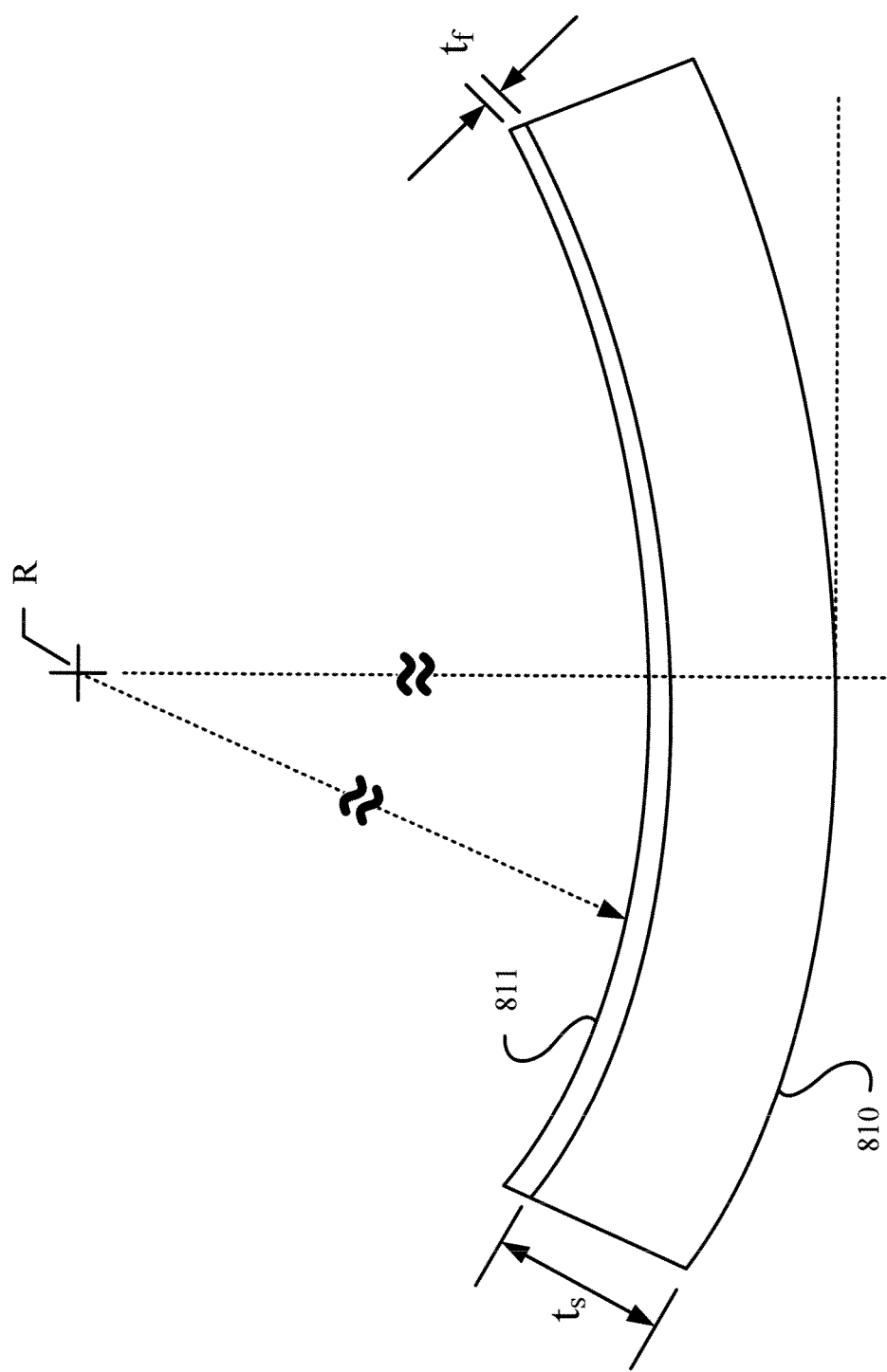
FIG. 8B illustrates an exemplary substrate with a thin film thereon imparting tensile stress, resulting in concave-up strain of the substrate.

Stoney's equation defines the film stress σ as:

$$\sigma = \frac{E_S}{(1-v_s)} \frac{t_s^2}{6R_{OC}t_f}$$

where E is the elastic modulus of the substrate, $v_S$ is Poisson's ratio of the substrate, $R_{OC}$ is the effective radius of curvature, $t_s$ is the substrate thickness, and $t_f$ is the film thickness. Thus, curvature is related to the residual stress using Stoney's equation. FIG. 8B illustrates an exemplary strained substrate 810 with a thin film 811 thereon having tensile stress.

Notably, the effective radius of curvature can be defined as:

$$R_{OC} = \frac{R_1 R_2}{R_1 - R_2}$$

where $R_1$ is the initial radius of curvature and $R_2$ is the radius of curvature after film deposition. Particularly, $R_1$ and $R_2$ refer to a global or an average value of radius of curvature per wafer. However, with the availability of more localized shape curvature information, local stress variation (showing variation in stress across the wafer) may be obtained using formulations such as the Stoney's equation under certain conditions, or other methods known in the industry. In one embodiment, this modeling can take into account local boundary conditions. Thus, stress induced by film depositions may be accurately measured using BF-DIC by determining the difference between the corrected shape (curvature) measurement pre- and post-film deposition, thereby allowing most of the chuck-induced distortions to be cancelled out.

In one embodiment, laser diodes of specific wavelengths can be used as light sources. In such cases, it may be possible to miniaturize an enhanced BF-DIC system. As such, the system can remain distinct from the operation of other inspection, metrology, or wafer processing functions and of other DIC channels, each of which may operate with a predetermined spot size and separation appropriate for surface slope measurement, defect detection, and/or review imaging.

Figure 9:
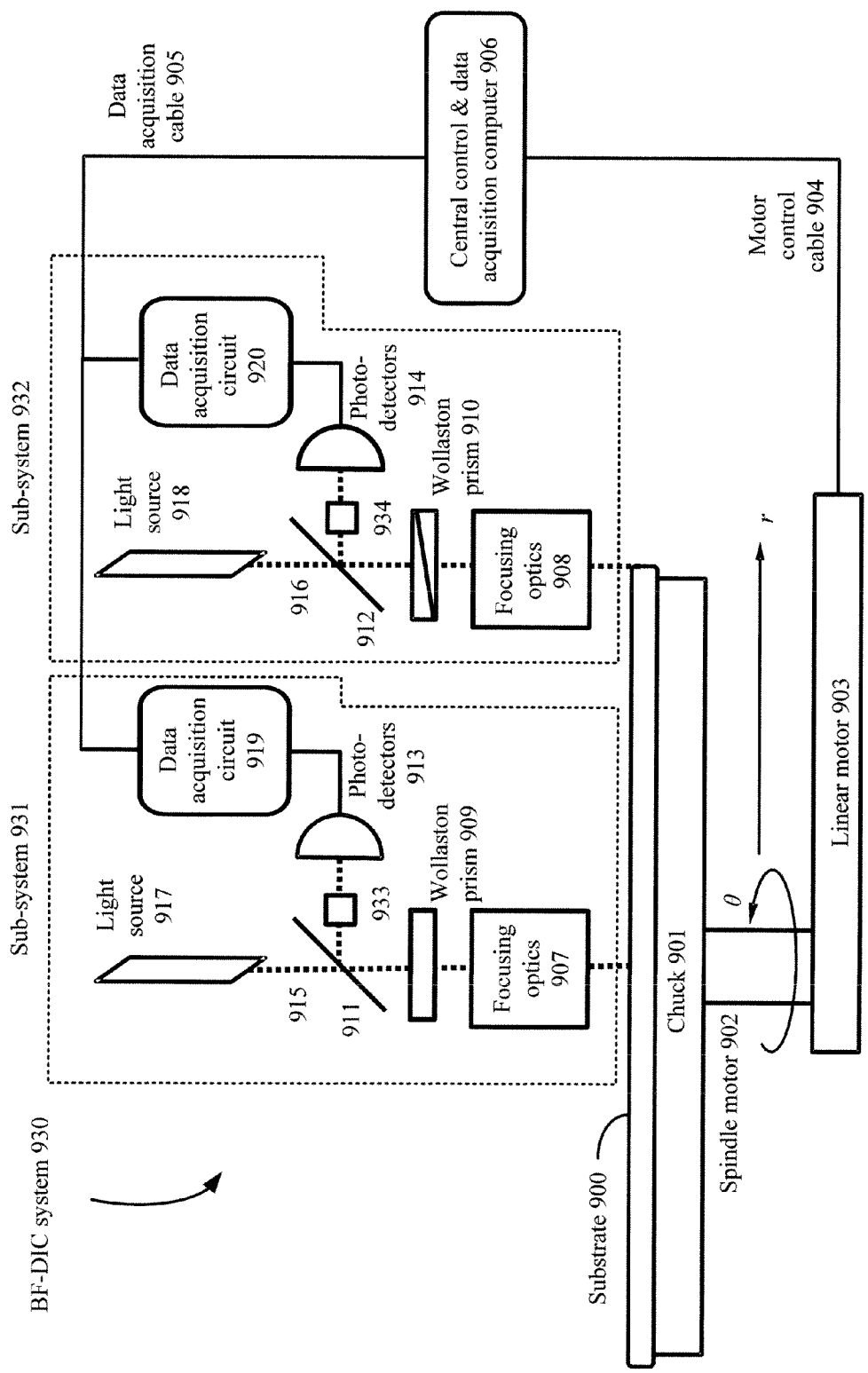
FIG. 9 illustrates a computer-controlled inspection system employing a plurality of BF-DIC sub-systems to collect radial and tangential slope information in a single scan.

For example, FIG. 9 illustrates an exemplary, enhanced BF-DIC system 930 including a plurality of separate DIC sub-systems. In this embodiment, BF-DIC system 930 has two sub-systems 931 and 932, each sub-system having substantially similar optical components. For example, sub-system 931 includes a light source 917 that produces a light beam 915. A Wollaston prism 909 receives light beam 915 after passing through a beamsplitter 911. Focusing optics 907 can be configured to focus the two light beams generated by Wollaston prism 909 onto a substrate 900 as first scanning spots. Substrate 900 can be secured by a chuck 901, which is movable using a spindle motor 902 (providing rotation θ) and a linear motor 903 (providing x-y movement, e.g. moving in a radial direction r). Both spindle motor 902 and linear motor 903 can be controlled by a central control and data acquisition computer 906 via a motor control cable 904 (shown connected to linear motor 903 for illustration simplicity). Light reflecting from substrate 900 from the first scanning spots is redirected by focusing optics 907 through Wollaston prism 909, which recombines the light. Mixing optics 933 direct the recombined light from Wollaston prism 909 (via beamsplitter 911) onto photo-detectors 913. A data acquisition circuit 919 receives the output of photo-detectors 913 for processing. Central control and data acquisition computer 906 receives the processed data from data acquisition circuit 919 via a data acquisition cable 905.

Sub-system 932 includes similar optical components to those of sub-system 931. Specifically, sub-system 932 includes a light source 918 that produces a light beam 916. Note that in one embodiment, light source 918 can be the same as light source 917, wherein the output light beam can be directed to sub-systems 931 and 932 using standard optical components. In this embodiment, the light source can be characterized as being external to one or any sub-system. A Wollaston prism 910 receives light beam 916 after passing through a beamsplitter 912. Focusing optics 908 can be configured to focus the two light beams generated by Wollaston prism 910 onto substrate 900 as second scanning spots. Light reflecting from substrate 900 from the second scanning spots is redirected through Wollaston prism 910, which recombines the light. Mixing optics 934 direct the recombined light from Wollaston prism 910 (via beamsplitter 912) onto photo-detectors 914. A data acquisition circuit 920 receives the output of photo-detectors 914 for processing. Central control and data acquisition computer 906 receives the processed data from data acquisition circuit 920 via data acquisition cable 905.

In one embodiment, the optical components of sub-systems 931 and 932 can produce light beams with dimensions, shapes, orientations, and displacements suited to their intended uses. For example, in one embodiment, Wollaston prism 909 can have a first orientation that generates two beams that are tangentially-displaced, whereas Wollaston prism 910 can have a second orientation that generates two beams that are radially-displaced. With these orientations, focusing optics 907 could be configured to generate elliptical beams, whereas focusing optics 908 could be configured to generate round beams. As noted in FIG. 9, each sub-system could interrogate a different region of the wafer, e.g. sub-system 931 could focus at a center of substrate 900 and sub-system 932 could focus at the wafer edge. In one embodiment, the positions of such focusing can be changed during the r-θ scan.

Note that some preferred embodiments, the wavelengths for the light sources of a set of DIC sub-systems are different, although in other embodiments the wavelengths could be the same. In either case, isolation of the sub-systems to prevent optical or electronic cross-talk is an important consideration for the implementation of a particular embodiment, using common methods and techniques well-known to those skilled in the art.

In another embodiment, a plurality of miniaturized BF-DIC systems may operate at distinct wavelengths. For example, the wavelength can be extended to the near-IR, where the optical skin depths of important substrate materials, e.g. such as silicon, increase to 10-100's of microns to nearly complete transparency depending on dopant type and concentration. In this embodiment, one may not only enable sub-surface defect detection, but the combined DIC signals acquired at different wavelengths may be processed into three-dimensional depth profiles of a substrate.

In one embodiment, the results of the enhanced BF-DIC techniques described herein can characterize and/or monitor a wafer process. Advantageously, the results can be used as feedback or fed forward to another wafer process. For example, in one embodiment, the results of the scanning can be used to characterize and/or monitor an integrated circuit manufacturing processes such as chemical-mechanical polishing (CMP), Rapid Thermal Processing (RTP), Chemical Vapor Deposition (CVD), etc.

Although illustrative embodiments of the invention have been described in detail herein with reference to the accompanying figures, it is to be understood that the invention is not limited to those precise embodiments. They are not intended to be exhaustive or to limit the invention to the precise forms disclosed. As such, many modifications and variations will be apparent to practitioners skilled in this art.

For example, in one embodiment, instead of using a Wollaston prism, the polarized light can be split using a Nomarski prism, which also consists of two wedges of a birefringent material, wherein a first wedge is configured as the above-described Wollaston prism and a second wedge has its optical axis obliquely positioned, thereby providing an interference plane that lies outside the prism. In this configuration, the Nomarski prism can be located outside the aperture plane of the objective lens, thereby providing further flexibility of component positioning.

Further, although inspection and metrology of a wafer or portions thereof are described in the embodiments, the enhanced BF-DIC techniques can be used for any substrate. Moreover, although an r-θ scan is described herein, in other embodiments, an x-y scan can be performed on the substrate. In this scan, first and second beams are created from a first light beam. The first and second beams have round cross-sections, and form first partially overlapping scanning spots displaced in a first direction. Third and fourth beams are created from either the first light beam or a second light beam. The third and fourth beams have elliptical cross-sections, and form second partially overlapping scanning spots displaced in a second direction, wherein the first direction and the second direction are orthogonal. At least one portion of the substrate is scanned using the first and second partially overlapping scanning spots as the substrate is moved.

Accordingly, it is intended that the scope of the invention be defined by the following claims and their equivalents.

The invention claimed is:

1. A method of providing high accuracy inspection or metrology in a bright-field differential interference contrast (BF-DIC) system, the method comprising:
   creating a first beam and a second beam from a first light beam, the first beam and the second beam having round cross-sections, and the first beam and the second beam forming first partially overlapping scanning spots radially displaced on a substrate;
   creating a third beam and a fourth beam from one of the first light beam and a second light beam, the third beam and the fourth beam having elliptical cross-sections, and the third beam and the fourth beam forming second partially overlapping scanning spots tangentially displaced on the substrate; and
   scanning at least one portion of the substrate using the first partially overlapping scanning spots and the second partially overlapping scanning spots as the substrate is rotated.

2. The method of claim 1, further including:
   determining a radial slope using measurements obtained from said scanning the at least one portion of the substrate using the first partially overlapping scanning spots as the substrate is rotated.

3. The method of claim 1, further including:
   determining a tangential slope using measurements obtained from said scanning the at least one portion of the substrate using the second partially overlapping scanning spots as the substrate is rotated.

4. The method of claim 1, further including:
   determining a radial slope using measurements obtained from said scanning the at least one portion of the substrate using the first partially overlapping scanning spots as the substrate is rotated;
   determining a tangential slope using measurements obtained from said scanning the at least one portion of the substrate using the second partially overlapping scanning spots as the substrate is rotated;
   determining a substrate curvature using the radial slope and the tangential slope; and
   determining an edge roll-off of the substrate using the substrate curvature.

5. The method of claim 1, further including;
   determining a radial slope using measurements obtained from said scanning the at least one portion of the substrate using the first partially overlapping scanning spots as the substrate is rotated;
   determining a tangential slope using measurements obtained from said scanning the at least one portion of the substrate using the second partially overlapping scanning spots as the substrate is rotated;
   determining an integrated height of the substrate using the radial slope and the tangential slope; and
   determining a substrate shape using the integrated height.

6. The method of claim 5, further including compensating for chucking distortions when determining the substrate shape.

7. The method of claim 5, further including:
   determining the substrate shape before and after deposition of a layer on the substrate;
   computing a shape difference based on the substrate shape before and after the deposition; and
   generating a film-stress map based on the shape difference.

8. The method of claim 1, further including;
   determining a radial slope using measurements obtained from said scanning the at least one portion of the substrate using the first partially overlapping scanning spots as the substrate is rotated;
   determining a tangential slope using measurements obtained from said scanning the at least one portion of the substrate using the second partially overlapping scanning spots as the substrate is rotated;
   determining an integrated height of the substrate using the radial slope and the tangential slope; and
   determining a substrate shape using the integrated height; and
   determining a substrate topography by applying filtering to the substrate shape.

9. The method of claim 1, further including;
   determining a radial slope using measurements obtained from said scanning the at least one portion of the substrate using the first partially overlapping scanning spots as the substrate is rotated;
   determining a tangential slope using measurements obtained from said scanning the at least one portion of the substrate using the second partially overlapping scanning spots as the substrate is rotated;
   determining an integrated height of the substrate using the radial slope and the tangential slope; and
   determining a substrate topography by applying filtering to the integrated height.

10. The method of claim 1, further including using results of said scanning the at least one portion of the substrate to at least one of characterize, monitor, calibrate, or modify a substrate process.

11. The method of claim 1, further including using results of said scanning the at least one portion of the substrate to at least one of characterize, monitor, or modify an integrated circuit chemical-mechanical polishing (CMP) process.

12. The method of claim 1, wherein the substrate is patterned.

13. The method of claim 1, wherein the substrate is unpatterned.

14. A method of providing high accuracy inspection or metrology in a bright-field differential interference contrast (BF-DIC) system, the method comprising:
   creating a first beam and a second beam from a first light beam, the first beam and the second beam having round cross-sections, and the first beam and the second beam forming first partially overlapping scanning spots displaced in a first direction on a substrate;
   creating a third beam and a fourth beam from one of the first light beam and a second light beam, the third beam and the fourth beam having elliptical cross-sections, and the third beam and the fourth beam forming second partially overlapping scanning spots displaced in a second direction on the substrate, wherein the first direction and the second direction are orthogonal; and
   scanning at least one portion of the substrate using the first partially overlapping scanning spots and the second partially overlapping scanning spots as the substrate is moved.

15. The method of claim 14, further including:
   determining a first slope in the first direction using measurements obtained from said scanning the at least one portion of the substrate using the first partially overlapping scanning spots as the substrate is moved.

16. The method of claim 14, further including:
determining a second slope in the second direction using measurements obtained from said scanning the at least one portion of the substrate using the second partially overlapping scanning spots as the substrate is moved.

17. The method of claim 14, further including:
determining a first slope in the first direction using measurements obtained from said scanning the at least one portion of the substrate using the first partially overlapping scanning spots as the substrate is moved;
determining a second slope using measurements obtained from said scanning the at least one portion of the substrate using the second partially overlapping scanning spots as the substrate is moved;
determining a substrate curvature using the first slope and the second slope; and
determining an edge roll-off of the substrate using the substrate curvature.

18. The method of claim 14, further including;
determining a first slope in the first direction using measurements obtained from said scanning the at least one portion of the substrate using the first partially overlapping scanning spots as the substrate is moved;
determining a second slope in the second direction using measurements obtained from said scanning the at least one portion of the substrate using the second partially overlapping scanning spots as the substrate is moved;
determining an integrated height of the substrate using the first slope and the second slope; and
determining a substrate shape using the integrated height.

19. The method of claim 18, further including compensating for chucking distortions when determining the substrate shape.

20. The method of claim 18, further including:
determining the substrate shape before and after deposition of a layer on the substrate;
computing a shape difference based on the substrate shape before and after the deposition; and
generating a film-stress map based on the shape difference.

21. The method of claim 14, further including;
determining a first slope in the first direction using measurements obtained from said scanning the at least one portion of the substrate using the first partially overlapping scanning spots as the substrate is moved;
determining a second slope using measurements obtained from said scanning the at least one portion of the substrate using the second partially overlapping scanning spots as the substrate is moved;
determining an integrated height of the substrate using the first slope and the second slope; and
determining a substrate shape using the integrated height; and
determining a substrate topography by applying filtering to the substrate shape.

22. The method of claim 14, further including;
determining a first slope in the first direction using measurements obtained from said scanning the at least one portion of the substrate using the first partially overlapping scanning spots as the substrate is moved;
determining a second slope in the second direction using measurements obtained from said scanning the at least one portion of the substrate using the second partially overlapping scanning spots as the substrate is moved;
determining an integrated height of the substrate using the first slope and the second slope; and
determining a substrate topography by applying filtering to the integrated height.

23. The method of claim 14, further including using results of said scanning the at least one portion of the substrate to at least one of characterize, monitor, calibrate, or modify a substrate process.

24. The method of claim 14, further including using results of said scanning the at least one portion of the substrate to at least one of characterize, monitor, or modify an integrated circuit chemical-mechanical polishing (CMP) process.

25. The method of claim 14, wherein the substrate is patterned.

26. The method of claim 14, wherein the substrate is unpatterned.

* * * * *